ced Examiner—George F. Lesmes

United States Patent [19]

Hall et al.

[11] 4,201,832
[45] May 6, 1980

[54] NON MELT-DRIP FLAME RETARDANT POLYCARBONATE COMPOSITION

[75] Inventors: Walter L. Hall, Mt. Vernon; William J. J. O'Connell, Evansville, both of Ind.

[73] Assignee: General Electric Company, Pittsfield, Mass.

[21] Appl. No.: 918,485

[22] Filed: Jun. 23, 1978

[51] Int. Cl.² .............................................. B32B 27/36
[52] U.S. Cl. ............................. 428/412; 260/45.8 RW
[58] Field of Search ................. 428/412; 260/45.8 RW

[56] References Cited

U.S. PATENT DOCUMENTS

| 3,544,657 | 12/1970 | Schütze et al. | 428/412 |
| 3,843,390 | 10/1974 | Hudson et al. | 428/412 |
| 4,082,894 | 4/1978 | Yoshida | 428/412 |
| 4,113,695 | 9/1978 | Mark | 260/45.8 RW |

*Primary Examiner*—George F. Lesmes
*Assistant Examiner*—E. Rollins Buffalow
*Attorney, Agent, or Firm*—Myron B. Kapustij; William F. Mufatti

[57] ABSTRACT

A coated non melt-drip and non-opaque flame retardant polycarbonate article having improved abrasion, scratch and chemical resistance, comprising an admixture of an aromatic carbonate polymer and a metal salt of a monomeric or polymeric unsubstituted or substituted aliphatic, aromatic or heterocyclic sulfonic acid, said article having deposited on the surface thereof a coating comprised of a certain aminoplast adhesion promoter and levelling agent, a diol, a certain melamine, and a polyol.

12 Claims, No Drawings

NON MELT-DRIP FLAME RETARDANT POLYCARBONATE COMPOSITION

This invention is directed to a coated non melt-drip, non-opaque flame retardant shaped polycarbonate article having good abrasion, scratch and chemical resistance and in particular, a shaped polycarbonate article comprised of a blend of a polycarbonate resin and a metal salt of either monomeric or polymeric unsubstituted or substituted aliphatic, aromatic or heterocyclic sulfonic acid, said article having a surface coating thereon comprising a certain aminoplast adhesion promoter and levelling agent, a diol, a polyol, and a melamine compound.

BACKGROUND OF THE INVENTION

With the increasing concern for safety, there is a positive move toward providing safe materials for public and household use. One particular area of need is that of providing flame retardant, non melt-drip and non-opaque products having good abrasion, mar, and chemical resistance for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for flame retardant characteristics.

In the art, there are many known flame retardant additives which are employed by mixing with products to render such materials flame retardant. Such flame retardant additives have been known to be employed in amounts of 5 to 20 weight percent in order to be effective in avoiding burning of those products which are combustible. It has also been found, however, that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

Furthermore, in many instances, it is desirable that articles produced from these first retardant polycarbonate resins not only be fire retardant but that they also be non melt-dripping, i.e., not melt-drip upon the application of flame and/or heat thereto, and resistant to abrasion, marring, and chemical attack, while at the same time retaining their non-opaque characteristics.

While commercial liquid coating compositions are available, many of the coating compositions are not suitable for coating polycarbonate articles since they are not compatible with the polycarbonate. Also, the uncured coating may adversely affect the polycarbonate article by stress cracking and crazing it, by causing crack propagation into the polycarbonate as a result of brittleness of the coating itself and/or by reducing the properties of the polymer generally such as, for example, impact resistance, elongation, tensile strength and so on. Further, several coatings, while compatible with the polycarbonate, have little or no chemical barrier properties and/or poor adhesion while others impart little or no non-drip properties to the polycarbonate.

Therefore, a successful non-drip coating for polycarbonate articles must be compatible with the polycarbonate, provide barrier or other desirable surface properties while maintaining mechanical or other properties of the polymer substrate and themselves provide chemically resistant surfaces, and be drip-resistant when exposed to flames and/or heat.

DESCRIPTION OF THE INVENTION

It has now been discovered that an aromatic polycarbonate can be made flame retardant, suitably protected against melt-dripping due to the application of heat and/or flame, and mar, abrasion and chemical resistant while retaining its non-opaque characteristics by (i) incorporating with the aromatic polycarbonate a flame retardant amount of certain flame retardant additives, which additives are inert, do not degrade the aromatic polycarbonate and also retain the non-opaque characteristics of the polycarbonate composition; and (ii) coating the polycarbonate article with coating compositions which provide the polycarbonate article with non-melt, mar resistant, abrasion resistant, and chemical resistant properties and which are compatible with the polycarbonate articles and retain the non-opaque characteristics of the polycarbonate article.

By flame retardant amount is meant an amount of flame retardant additives which is effective to impact flame retardant properties to the carbonate polymer. Generally, as regards the flame retardant additives of the instant invention, this amount ranges from about 0.001% to about 10.0% by weight, preferably from about 0.01% to about 7%, and more preferably, from about 0.05% to about 5.0%.

These additives are selected from the group consisting of the alkali and alkaline earth metal salts of unsubstituted or substituted monomeric or polymeric aliphatic, aromatic or heterocyclic sulfonic acids. More particularly, the anionic portion of these salts are selected from monomeric or polymeric aromatic sulfonates;
monomeric or polymeric substituted aromatic sulfonates;
monomeric or polymeric aromatic sulfonesulfonates;
aromatic ketone sulfonates;
heterocyclic sulfonates;
halogenated methanesulfonates;
perfluoroalkane sulfonates;
aromatic sulfide sulfonates;
monomeric or polymeric aromatic ether sulfonates;
aliphatic and olefinic sulfonates;
monomeric or polymeric phenol ester sulfonates;
halocycloaliphatic aromatic sulfonates;
monomeric or polymeric aromatic amide sulfonates.

These anionic sulfonates are fully described in their alkali metal and alkaline earth metal salt form, in the following patents and applications:

U.S. Pat. No. 3,933,734 (A) issued on Jan. 20, 1976, titled Flame Retardant Polycarbonate Composition, discloses a flame retardant polycarbonate composition of an aromatic carbonate polymer containing in admixture therewith, an additive which is the metal salt of either the monomeric or polymeric aromatic sulfonic acids or mixtures thereof.

U.S. Pat. No. 3,940,366 (B) issued on Feb. 24, 1976, titled Flame Retardant Polycarbonate Composition, discloses a flame retardant polycarbonate composition of an aromatic carbonate polymer containing in admixture therewith, an additive which is the metal salt of either the monomeric or polymeric substituted aromatic sulfonic acids or mixtures thereof.

U.S. Pat. No. 3,948,851 (C) issued on Apr. 6, 1976, titled Flame Retardant Polycarbonate Composition, discloses a flame retardant polycarbonate composition of an aromatic carbonate polymer containing in admixture therewith, an additive which is the metal salt of either the monomeric or polymeric aromatic sulfone sulfonic acids or mixtures thereof.

U.S. Pat. No. 3,926,908 (D) issued on Dec. 16, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic ketones and mixtures thereof.

U.S. Pat. No. 3,919,167 (E) issued on Nov. 11, 1975, titled Flame Retardant Polycarbonate Composition, discloses a flame retardant polycarbonate composition of an aromatic carbonate polymer containing in admixture therewith, an additive which is the metal salts of heterocyclic sulfonic acids.

Application Ser. No. 429,125, filed Dec. 28, 1973 (F) of Victor Mark, titled Flame Retardant Polycarbonate Composition and assigned to the same assignee as the present invention, discloses a flame retardant polycarbonate composition of an aromatic carbonate polymer containing in admixture therewith, an additive which is the metal salt of halogenated methanesulfonic acids or mixtures thereof. Also, included herein are perfluoroalkane alkali metal and alkaline earth metal sulfonates, or perfluoroalkane ammonium sulfonates as set forth in U.S. Pat. No. 3,775,367 (G).

U.S. Pat. No. 3,909,490 (H) issued Sept. 30, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic sulfides and mixtures thereof.

U.S. Pat. No. 3,953,396 (I) issued Apr. 27, 1976, titled Flame Retardant Polycarbonate Composition, discloses a flame retardant polycarbonate composition of an aromatic carbonate polymer containing in admixture therewith, an additive which is the metal salt of either the substituted or unsubstituted sulfonic acid or an aromatic ether.

U.S. Pat. No. 3,931,100 (J) issued Jan. 6, 1976, titled A Flame Retardant Polycarbonate Composition, discloses a flame retardant polycarbonate composition of an aromatic carbonate polymer containing in admixture therewith a metal salt of aliphatic and olefinic sulfonic acids or mixtures thereof.

U.S. Pat. No. 3,978,024 (K) issued Aug. 31, 1976, titled A Flame Retardant Polycarbonate Composition, discloses a flame retardant polycarbonate composition of an aromatic carbonate polymer containing in admixture therewith, metal salts of either monomeric or polymeric phenol ester sulfonic acids or mixtures thereof.

U.S. Pat. No. 3,917,559 (L) issued Nov. 4, 1975, titled A Flame Retardant Polycarbonate Composition, discloses a flame retardant polycarbonate composition of an aromatic carbonate polymer containing in admixture therewith, metal salts of halocycloaliphatic sulfonic acids.

U.S. Pat. No. 3,951,910 (M) issued Apr. 2, 1976, titled A Flame Retardant Polycarbonate Composition, discloses a flame retardant polycarbonate composition of an aromatic carbonate polymer containing in admixture therewith, a metal salt of either the monomeric or polymeric substituted and unsubstituted aromatic amine sulfonic acids or mixtures thereof.

Patents and applications (A) through (M) are incorporated herein by reference.

As stated in the above-identified patents and applications, and as employed herein in the salts substituted by electron withdrawing radicals, the electron withdrawing radicals are the halo-, nitro-, trihalomethyl- and cyano-electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl) propane), bis(4-hydroxyphenyl) methane, 2,2-bis(4-hydroxy-3-methylphenyl) propane, 3,3-bis(4-hydroxyphenyl) pentane, 2,2-bis(3,5-dichloro-4-hydroxyphenyl) propane, 2,2-bis(3,5-dibromo-4-hydroxyphenyl) propane, bis(3-chloro-4-hydroxyphenyl) methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The polycarbonate compositions of this invention are prepared by admixing the aromatic carbonate polymer with the metallic salts. The metallic salts may be admixed with the polycarbonate in a finely divided solid form or they may be admixed in the form of a solution. Preferably, the metallic salts are dissolved in a solvent in which they are soluble such as methanol and water, for example. Most preferably, the salts are admixed with the polycarbonate in the form of an aqueous solution.

The polycarbonate composition of the instant invention may also contain fillers, pigments, dyes, antioxidants, stabilizers, ultraviolet light absorbers, mold release agents and other additives commonly employed in polycarbonate resin formulations.

The ultraviolet light absorber functions by reason of its ability to screen out the damaging ultraviolet portion of light due to its very high absorptivity relative to that of the polymer. In order to qualify as a successful ultraviolet light absorber for addition to a polycarbonate resin, there are several requirements which the absorber must fulfill. The absorber must have a high specific absorptivity in the range of wave lengths that are most deleterious to the material and that are present in the source of exposure. The absorber itself must be photochemically stable and be able to dissipate the absorbed energy, for example, as heat energy, without itself being decomposed or causing degradation of the plastic. In addition, the absorber must not significantly absorb in the visible region of the spectrum or a color will be imparted to the material to which it has been added. The absorber must exhibit compatibility with the resin and not degrade it with loss of properties and increase in color. The absorber must also have a sufficiently low volatility to permit its continued residence in the polymer. Two types or organic compound found to fulfill these conditions are the benzophenones and substituted benzotriazoles. Within these groups the members thereof exhibit a variety of usefulness and it is much preferred that either 2,2'-dihydroxy-4,4'dimethoxy benzophenone or 2-(2'-hydroxy 5'-methylphenol) benzotriazole be used in carrying out the invention herein.

Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium oxide and the like.

The coating composition of the present invention is comprised of four constituent components. The first component is a malamine represented by the general formula

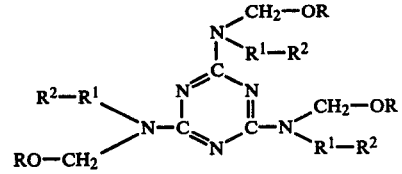

wherein R is independently selected from hydrogen or a lower alkyl group, preferably one containing from 1 to about 4 carbon atoms; $R^1$ is independently selected from an alkylene group, preferably one containing from 1 to about 4 carbon atoms; and $R^2$ is independently selected from hydroxy, a lower alkoxy group, preferably one containing from 1 to about 4 carbon atoms, or a lower alkyl group, preferably one containing from 1 to about 4 carbon atoms. Preferably, the melamine compound represented by formula I is a hexaalkyl ether of hexamethylol-melamine represented by the general formula

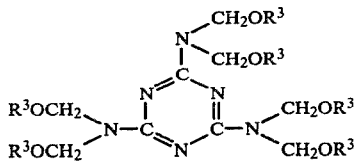

wherein $R^3$ is independently selected from a lower alkyl group, preferably one containing from 1 to about 4 carbon atoms.

Some non-limiting specific examples of compounds represented by Formula II, above, include hexabis(methoxymethyl) melamine, hexabis(ethoxymethyl) melamine, hexabis(n-propoxymethyl) melamine, hexabis(n-butoxymethyl) melamine, hexabis(t-butoxymethyl) melamine, and hexabis(isobutoxymethyl) melamine.

The second component is a polyester polyol or a polyether polyol. The polyester polyol or polyether polyol may be selected from a wide variety of polyols such as triols, tetrols, and the like and mixtures thereof containing aliphatic groups, polyaliphatic ether groups, or polyaliphatic ester groups. While it is possible to have some aromatic, cycloaliphatic and branched aliphatic groups, it is preferred in the practice of the present invention that the organic moieties be subsequently linear aliphatic moieties. The aliphatic polyester polyols are generally the more preferred compounds.

Any suitable polyhydroxyl polyester may be used such as, for example, the reaction product of a polycarboxylic acid and a polyhydric alcohol. Any suitable polycarboxylic acid may be used in the preparation of a polyester such as, for example, adipic acid, succinic acid, suleric acid, selacic acid, oxalic acid, methyladipic acid, glutaric acid, pimelic acid, azelaic acid, phthalic acid, terephthalic acid isophthalic acid, 1,2,4-benzene tricarboxylic acid, thiodiglycollic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, diethylene glycol, propylene glycol, butanediol, hexane diol, hexane triol, glycerine, bis-(hydroxy-methylcyclohexane), trimethylol propane, pentaerythritol and the like.

Any suitable polyhydric poly(alkylene ether) may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology", volume 1, pages 257 to 262, published by Interscience Publishers in 1951. Among the commercially available aliphatic polyester polyols which are particularly well suited to the practice of the instant invention are the polyester polyols sold under the trade designation Multron R-10, Multron R-12 and Desmophen 1100 by Mobay Chemical Company. Multron R-12, for example, has a molecular weight of about 1000 and has three hydroxyl groups per molecule. The material has an average equivalent weight, based on hydroxyl groups, of about 330.

A third constituent component of the coating composition is a diol, preferably a lower alkyl diol containing from 2 to about 8 carbon atoms. Some such limiting examples of these preferred diols are 1,4-butanediol, 1,2-ethanediol, 1,2-propanediol, 1,3-propanediol, 1,2-butanediol, 2,3-dimethyl-2,3-butanediol, and the like.

The coating composition also contains an adhesion and levelling agent. Generally, this adhesion and levelling agent contains an aminoplast, preferably a melamine compound. The adhesion and levelling agent which has been found to be extremely effective in formulating the coating of the present invention is one sold under manufacturers code identification R-830 by Bee Chemical Company, Lansing, Illinois, which contains the reaction product of a melamine compound and a hydroxylized functionalized acrylate.

The cured coating composition containing the aforedescribed melamine compound, polyester or polyether polyol, diol, and adhesion and levelling agent possess the following properties: non-melt-drip, abrasion and mar resistance, resistance to chemical attack, good adhesion to the polycarbonate substrate, and compatibility with the polycarbonate substrate, e.g., the coating does not adversely affect the polycarbonate substrate by stress cracking and crazing it, by causing crack propogation into the polycarbonate as a result of brittleness of the coating itself and/or reducing the properties of the polymer generally, such as, for example, impact resistance, elongation, tensile strength and so on.

The coating compositions of the present invention are prepared by first formulating a pre-reaction mixture by mixing together the diol, the melamine compound of formula I, the polyester polyol or polyether polyol, and the aminoplast adhesion promoter and levelling agent and thereafter curing the pre-reaction mixture in place on the polycarbonate article. Also generally added to this mixture are a catalytic amount of an acid catalyst and a solubilizing amount of a solvent. This pre-reaction mixture is kept from reacting until after it is applied onto the polycarbonate substrate. This is accomplished by keeping the temperature below about 40° C. and/or including in the pre-reaction mixture a volatile acid catalyst blocking agent such as an amine, e.g., triethylamine. After the pre-reaction mixture has been applied to the polycarbonate substrate curing is initiated by heating the pre-reaction mixture coated polycarbonate substrate. Heating is continued until the coating is cured, i.e., cross-linking is finished. If an acid catalyst blocking agent such as a volatile amine is present, heating serves to volatilize the amine thus removing it from the mixture and thereby freeing the catalyst to catalyze the reaction.

Generally, the reaction can be carried out at atmospheric, subatmospheric or superatmospheric pressure, with atmospheric pressures being preferred. The temperature at which the reaction products are produced generally range from about 50° C. to about 150° C., preferably from about 80° C. to about 120° C.

The weight ratio of the diol to the melamine compound of formula I to the polyester or polyether polyol ranges from about 1:1:3 to about 3:3:1, respectively, with a ratio of about 1:2:1 being preferred. The weight ratio of the diol, melamine compound of formula I and polyester or polyether polyol to the adhesion promoter and levelling agent, such as the R-830 produced by Bee Chemical Company, ranges from about 2:1 to about 10:1, respectively.

The acid catalysts which may be employed include such acids as sulfonic acid, hydrochloric acid, p-toluene sulfonic acid and the like as well as such organic acids as phthalic acid, oxalic acid, acetic acid, chloroacetic acid and the like. The amount of catalyst employed is a catalytic amount, i.e., an amount effective to catalyze the reaction. Generally, this amount ranges from about 0.1% to about 5.0%, preferably from about 1.0% to about 2.0%, by weight, of the coating composition.

The pre-reaction mixture preferably contains an organic solvent. Examples of suitable solvents include the ketones, such as acetone, methyl ethylketone; alcohols, such as methyl alcohol and propyl alcohol, the aromatic hydrocarbons such as benzene; dioxane; butyl acetate; and the like. The concentration of the solvent employed is not critical and generally any amount which solubilizes the reaction components is all that is necessary.

The coating compositions may, if desired, also contain such additives as antioxidants, accelerators, dyes, inhibitors, activators, fillers, pigments, antistatic agents, thickeners, thixotropic agents, surface active agents, viscosity modifiers, extending oils, plasticizers, tackifiers, UV light absorbing agents and the like. Such additives are usually preblended with the aforedescribed reactants prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to about 5000 parts or more per 100 parts of active coating ingredients by weight and preferably about 0.0005 to about 300 parts on the same basis.

The coating composition, i.e., the pre-reaction mixture, of the instant invention may be applied to the polycarbonate surface by any conventional coating technique such as roll, dip, curtain or spray. Following application curing in place to the polycarbonate may be effected either very rapidly or extremely slowly as desired by manipulation of the method of curing, i.e., temperature. Generally, the rate of the curing reaction may be increased by increasing the temperature. Generally, the temperature at which curing is accomplished is from about 50° C. to about 150° C.

Generally, the thickness of the coating on the polycarbonate substrate is from about 0.10 mil to about 1.0 mil, preferably from 0.15 mil to about 0.5 mil. The thickness may be controlled by any of the commonly known methods, i.e., speed of drawing the substrate through the pre-reaction mixture—the greater the speed, the thicker the coating—,amount of solvent present in the pre-reaction mixture—the more solvent present, the less viscose the pre-reaction mixture and the thinner the coating—,and the like.

DESCRIPTION OF THE PREFERRED EMBODIMENT

The following examples are set forth to illustrate more clearly the principle and practice of this invention to those skilled in the art. Unless otherwise indicated, all parts are parts by weight.

Example I

An aromatic polycarbonate is prepared by reacting 2,2-bis(4-hydroxyphenyl) propane and phosgene in the presence of an acid acceptor and a molecular weight regulator. This polycarbonate has an intrinsic viscosity of 0.57. The polycarbonate is fed to an extruder, which extruder is operated at about 265° C., and the extrudate is comminuted into pellets.

The pellets are then injection molded at about 315° C. into test bars of about 5 in. by ½ in. by about 1/16-⅛ in. thick. The test bars are subject to the test procedure set forth in Underwriters Laboratories, Inc. Bulletin UL-94, Burning Test for Classifying Materials and the results tabulated in Table I. In accordance with this test procedure, materials so investigated are rated either V-O, V-I or V-II based on the results of 5 specimens. The criteria for each V rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

Further, UL-94 requires that all test bars in each test group must meet the V type rating to achieve the particular classification. Otherwise, the 5 bars receive the rating of the worst single bar. For example, if one bar is classified as V-II and the other four (4) are classified as V-O, then the rating for all 5 bars is V-II.

Example II

Ninety-nine and ninety-five one hundredths (99.95) parts of an aromatic polycarbonate prepared by reacting 2,2-bis(4-hydroxyphenyl) propane and phosgene in the presence of an acid acceptor and a molecular weight regulator and having an intrinsic viscosity of 0.57 are mixed with 0.05 parts of the sodium salt of diphenylsulfone sulfonic acid by tumbling the ingredients together in a laboratory tumbler. The resulting mixture is fed to an extruder, which extruder is operated at about 265° C., and the extrudate is comminuted into pellets. The pellets are then injection molded at about 315° C. into test bars of about 5 in. by ½ in. by about 1/16-⅛ in. thick. The test bars are subjected to the test procedure UL-94 set forth above and the results tabulated in Table I.

Example III

Ninety-nine and ninety-five one hundredths (99.95) parts of an aromatic polycarbonate prepared by reacting 2,2-bis(4-hydroxyphenyl) propane and phosgene in the presence of an acid acceptor and a molecular weight regulator and having an intrinsic viscosity of 0.57 are mixed with 0.05 parts of the sodium salt of trichlorobenzene sulfonic acid by tumbling the ingredients together in a laboratory tumbler. The resulting mixture is then fed to an extruder, which extruder is operated at about 265° C., and the extrudate is comminuted into pellets. The pellets are then injection molded at about 315° C.

into test bars of about 5 in. by ½ in. by about 1/16-⅛ in. thick. The test bars are subjected to the test procedure UL-94 set forth above and the results tabulated in Table I.

Example IV

A pre-reaction coating composition is prepared by adding together 360 grams of R-380 produced and sold by Bee Chemical Company (an adhesive and levelling agent containing a melamine and a hydroxylized functionalized acrylate), 400 grams of 1,4-butanediol, 760 grams of hexabis(methoxy-methyl) melamine, 480 grams of Desmophen 1100, a hydroxyl terminated polyester, sold by Mobay Chemical Co., 1.1 grams of p-toluenesulfonic acid, and 1500 ml of 2-butoxy ethanol. This mixture is stirred, at room temperature, until all of the solids are dissolved.

Example V

A pre-reaction coating composition is prepared substantially in accordance with Example IV except that 6 grams of triethylamine are added to act as the acid catalyst blocking agent.

Example VI

Aromatic polycarbonate test bars prepared in accordance with Example I are coated with the pre-reaction coating composition of Example IV by immersing the bars in the bath of said coating composition until there is deposited thereon a coating of about 0.2 mil thickness. The coated bars are then heated at about 125° C. for about 2 hours to cure the coating. These bars are then subjecting to testing procedure UL-94 and the results are set forth in Table I.

Example VII

Aromatic polycarbonate test bars prepared in accordance with Example II are coated with the pre-reaction coating composition of Example IV by immersing the bars in the bath of said coating composition until there is deposited thereon a coating of about 0.2 mil thickness. The coated bars are then heated at about 120° C. for about 2 hours to cure the coating. These bars are then subjected to testing procedure UL-94 and the results are set forth in Table I.

Example VIII

Aromatic polycarbonate test bars prepared in accordance with Example II are coated with the pre-reaction coating composition of Example IV by immersing the bars in the bath of said coating composition until there is deposited thereon a coating of about 0.2 mil thickness. The coated bars are then heated at about 125° C. for about 2 hours to cure the coating. These bars are then subjected to testing procedure UL-94 and the results are set forth in Table I.

TABLE I

| EXAMPLE # | Flame Out Time in Seconds (Arg) | Drip | Rating |
|---|---|---|---|
| I | 20.3 | Yes | Burns |
| II | 8.7 | Yes | V-II |
| III | 8.5 | Yes | V-II |
| VI | 58.7 | Yes | Burns |
| VII | 7.1 | No | V-I |
| VIII | 8.3 | No | V-I |

As can be seen from the foregoing Examples, the results of which are set forth in TABLE I, the combination of the coating composition and flame retardant additives when used in a polycarbonate article have a synergistic effect. Examples II and III show that a non-coated polycarbonate article containing the flame retardant additives of the present invention while having a flame out time substantially less than that of the control of Example I, i.e., the non-coated polycarbonate containing no flame retardant additives, are nevertheless rated V-II due to dripping of flaming particles. Example VI shows that a coated polycarbonate article containing no flame retardant additives has a longer flame out time than the control of Example I and additionally drips flaming particles. However, Examples VII and VIII show that coated polycarbonate articles containing said flame retardant additives have a substantially shorter flame out time than either the control, Example I, or the coated polycarbonate devoid of flame retardant additives, Examples VI, and do not drip flaming particles.

What is claimed is:

1. A coated non melt-drip flame retardant polycarbonate article consisting essentially of an admixture of an aromatic carbonate polymer and a flame retardant amount of a compound selected from the group consisting of the alkali metal and alkaline earth metal salts of unsubstituted and substituted monomeric or polymeric aliphatic, aromatic or heterocyclic sulfonic acids and mixtures thereof, said polycarbonate article having deposited on the surface thereof an adherent, non melt-drip, abrasion, scratch and chemical solvent resistant coating consisting essentially of the reaction products of: (i) a melamine represented by the general formula

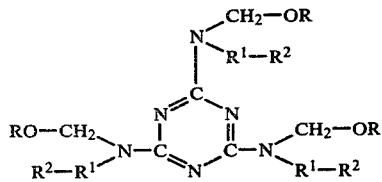

wherein each R is independently selected from hydrogen or a lower alkyl group, each $R^1$ is independently selected from an alkylene group, and each $R^2$ is independently selected from a hydroxy group, a lower alkoxy group, or a lower alkyl group; (ii) a lower alkyl diol; (iii) a polyester or polyether polyol; and (iv) an adhesion promoter and leveling agent consisting essentially of the reaction products of a melamine and a hydroxy functional acrylate.

2. The article of claim 1 wherein the anionic portion of said alkali metal and alkali earth metal salt is selected from the following anions:
monomeric or polymeric aromatic sulfonates;
monomeric or polymeric substituted aromatic sulfonates;
monomeric or polymeric aromatic sulfonesulfonates;
aromatic ketone sulfonates;
heterocyclic sulfonates;
halogenated methanesulfonates;
perfluoralkane sulfonates;
aromatic sulfide sulfonates;
monomeric or polymeric aromatic ether sulfonates;
aliphatic and olefinic sulfonates;
monomeric or polymeric phenol ester sulfonates;
halocycloaliphatic aromatic sulfonates;
monomeric or polymeric aromatic amide sulfonates.

3. The article of claim 1 wherein said carbonate polymer contains from about 0.001% to about 10% by weight of said salt.

4. The article of claim 1 wherein said melamine is represented by the general formula

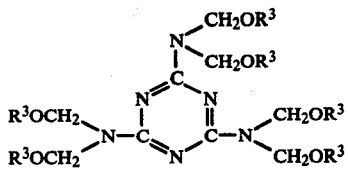

wherein $R^3$ is independently selected from lower alkyl groups containing from 1 to about 4 carbon atoms.

5. The article of claim 4 wherein $R^3$ is methyl.

6. The article of claim 4 wherein said polyol is a polyester polyol.

7. A coated non melt-drip flame retardant polycarbonate article consisting essentially of an admixture of an aromatic carbonate polymer and a flame retardant amount of a compound selected from the group consisting of alkali metal and alkaline earth metal salts of unsubstituted and substituted monomeric or polymeric aliphatic, aromatic or heterocyclic sulfonic acids and mixtures thereof, said polycarbonate article having deposited thereon a coating composition consisting essentially of (i) a melamine represented by the general formula

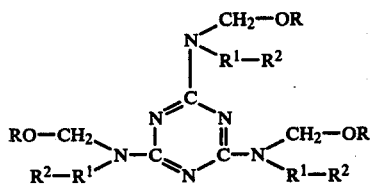

wherein each R is independently selected from hydrogen or a lower alkyl group, each $R^1$ is independently selected from an alkylene group, and each $R^2$ is independently selected from a hydroxy group, a lower alkoxy group, or a lower alkyl group; (ii) a lower alkyl diol; (iii) a polyester or polyether polyol; and (iv) an adhesion promoter and leveling agent consisting essentially of the reaction products of a melamine and a hydroxy functional acrylate.

8. The article of claim 7 wherein the anionic portion of said alkali metal and alkali earth metal salt is selected from the following anions:

monomeric or polymeric aromatic sulfonates;
monomeric or polymeric substituted aromatic sulfonates;
monomeric or polymeric aromatic sulfonesulfonates;
aromatic ketone sulfonates;
heterocyclic sulfonates;
halogenated methanesulfonates;
perfluoralkane sulfonates;
aromatic sulfide sulfonates;
monomeric or polymeric aromatic ether sulfonates;
aliphatic and olefinic sulfonates;
monomeric or polymeric phenol ester sulfonates;
halocycloaliphatic aromatic sulfonates;
monomeric or polymeric aromatic amide sulfonates.

9. The article of claim 7 wherein said carbonate polymer contains from about 0.001% to about 10% by weight of said salt.

10. The article of claim 7 wherein said melamine is represented by the general formula

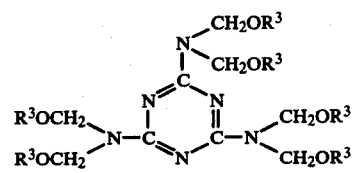

wherein $R^3$ is independently selected from lower alkyl groups containing from 1 to about 4 carbon atoms.

11. The particle of claim 10 wherein $R^3$ is methyl.

12. The article of claim 10 wherein said polyol is a polyester polyol.

* * * * *